US007808361B1

(12) United States Patent
Yu

(10) Patent No.: US 7,808,361 B1
(45) Date of Patent: Oct. 5, 2010

(54) DUAL PROTECTION DEVICE FOR CIRCUIT

(76) Inventor: Tsung Mou Yu, No. 4, Alley 2, Lane 23, Sec. 3, Pa Te Road, Panchiao, Taipei Hsien (TW)

( * ) Notice: Subject to any disclaimer, the term of this patent is extended or adjusted under 35 U.S.C. 154(b) by 199 days.

(21) Appl. No.: 12/277,299

(22) Filed: Nov. 25, 2008

(51) Int. Cl.
*H01H 85/00* (2006.01)
*H01H 37/00* (2006.01)
*H01H 31/00* (2006.01)
*H01H 61/00* (2006.01)
*H02H 9/02* (2006.01)

(52) U.S. Cl. ............................ 337/142; 337/36; 337/3; 337/4; 337/13; 361/105

(58) Field of Classification Search ................ 337/142, 337/3, 4, 13, 36; 361/105
See application file for complete search history.

(56) References Cited

U.S. PATENT DOCUMENTS 4,041,432 A * 8/1977 Yarworth et al. ............ 337/111
4,167,721 A * 9/1979 Senor et al. ................ 337/112
4,319,126 A * 3/1982 Lujic .......................... 219/512
4,433,231 A * 2/1984 Balchunas .................. 219/253
4,476,452 A * 10/1984 D'Entremont .............. 337/102
4,843,363 A * 6/1989 Ubukata et al. ............... 337/94
4,876,523 A * 10/1989 Kushida et al. ............. 337/299
5,015,985 A * 5/1991 Ubukata et al. ............. 337/368
5,196,820 A * 3/1993 Ubukata et al. ............. 337/368
5,212,465 A * 5/1993 Mizutani et al. ............ 337/368
5,221,914 A * 6/1993 Ubukata et al. ............... 337/13
5,659,285 A * 8/1997 Takeda ....................... 337/389
5,684,447 A * 11/1997 Korczynski et al. ............ 337/5
6,091,315 A * 7/2000 Hofsass ....................... 337/13
6,191,680 B1 * 2/2001 Hofsass ...................... 337/362
6,342,826 B1 * 1/2002 Quinn et al. ................ 337/300
6,396,381 B1 * 5/2002 Takeda ....................... 337/377
6,674,620 B2 * 1/2004 Lamborghini et al. ......... 361/26
6,741,159 B1 * 5/2004 Kuczynski .................. 337/403
7,026,907 B2 * 4/2006 Takeda ........................ 337/85
7,075,403 B2 * 7/2006 Unno et al. ................. 337/365
7,298,239 B2 * 11/2007 Yamada ...................... 337/107
2002/0044039 A1 * 4/2002 Takeda ....................... 337/377
2003/0043011 A1 * 3/2003 Renne et al. .................. 337/37
2006/0072275 A1 * 4/2006 Yu ............................ 361/105
2006/0250209 A1 * 11/2006 Yu .............................. 337/36
2008/0297301 A1 * 12/2008 Onken et al. ................ 337/219

* cited by examiner

*Primary Examiner*—Jayprakash N Gandhi
*Assistant Examiner*—Bradley H Thomas

(57) ABSTRACT

A dual protection device includes a cover, a first protection unit, a second protection unit and a base. The first protection unit includes an elastic contact piece and a first conductive member. The elastic contact piece has a first end fixed to the cover and a second end including a first contact point. The first conductive member has a second contact point to contact with the first contact point. The elastic contact piece bends to separate the first contact point from the second contact point when overloaded. The second protection unit has a second conductive member, which is respectively connected with the first conductive member and a second terminal by fuse members. A biasing member is compressed between the second conductive member and the base so as to separate the second terminal from the second conductive member when the fuse members melt.

7 Claims, 8 Drawing Sheets

DUAL PROTECTION DEVICE FOR CIRCUIT

BACKGROUND OF THE INVENTION

1. Field of the Invention

The present invention relates generally to a protection device for a circuit and more particularly, to a dual protection device having two units functioning independently to ensure that the circuit is protected overloaded, overheated, or shorted.

2. The Prior Arts

Electricity plays an import part in everyday life. There are innumerable applications of electricity in the world of today, from computers, home appliances, traffic, and education to entertainment. Therefore, how to use electricity safely is very important.

Generally speaking, a whole circuit includes a main switch which controls the ON and OFF states of the circuit. The main switch has a fuse and/or a circuit breaker to cut off the circuit and prevent the whole circuit from damage, when the circuit is overloaded, overheated, or shorted.

Moreover, the whole circuit may include several sub-circuits and each sub-circuit may have its own switch to control the ON and OFF states. In order to enhance the safety of the circuit, a lot of switches for the sub-circuit are also equipped with protection function. Thus, if the main switch does not function properly or cut off the circuit in time, the switches for the sub-circuits can still protect the whole circuit from over-temperature or over-current.

In addition to the fuses and circuit breakers for the whole circuits, some electric appliances with high power consumption, such as digital processing units, electronic products or heaters, are equipped with individual protection devices to prevent them from damage when these electric appliances are overload, overheat or short. Once the individual electric appliance is overloaded, overheated, or shorted, the protection device cuts off the circuit to protect the appliance and avoid damage to other appliances using the same circuit.

Referring to FIGS. 1 and 2, a conventional protection device for individual electric appliance includes a bi-metallic strip 101 which is slightly curved. The bi-metallic strip 101 bends one way if heated, and in the opposite direction if cooled off One end of the bi-metallic strip 101 is fixed to a first terminal 102 of the electric appliance and the other end of the bi-metallic strip 101 is a free end having a first contact point 103. A second terminal 104 of the electric appliance has a second contact point 105 which is located corresponding to the first contact point 103. When the first contact point 103 contacts with the second contact points 105, a closed circuit is formed as shown in FIG. 1. When the circuit is overloaded, overheated, or shorted, the temperature of the bi-metallic strip 101 is raised so that the bi-metallic strip 101 is bent toward the other direction and the first contact point 103 is separated from the second contact point 105. The circuit is cut off to become an open circuit and the electric appliance is then prevented from being burned.

However, the conventional bi-metallic strip has the following disadvantages. (1) When manufacturing the bi-metallic strip 101, it is difficult to maintain the precision of the thickness, curvature and configuration of the bi-metallic strip 101. Therefore, the predetermined temperature of the bi-metallic strip 101 to bend is difficult to control. (2) Some of the bimetallic strip 101 is not sensitive enough to the temperature and does not bend to cut off the circuit as expected when the circuit is overloaded. Therefore, the electric appliance and the circuit are not protected from being overloaded, overheated, or shorted. (3) Some of the bi-metallic strip 101 bends but does not completely separate the contact points 103 and 105. The circuit remains as a closed circuit. Thus, the appliance and the circuit are still damaged by overload. (4) Furthermore, some of the bi-metallic strip 101 does not separate the two contact points 103 and 105 to a sufficient distance. When the temperature slightly cools down, the bi-metallic strip 101 may bend again to re-connect the two contact points 103 and 105. When the temperature is raised again, the bi-metallic strip 101 bends to separate the two contact points 103 and 105. The repeated connection and separation of the circuit in a short period of time may generate sparks, which may cause fire. It also makes the electric current unstable. Thus, the electric appliance can not function properly and even be damaged.

SUMMARY OF THE INVENTION

A primary objective of the present invention is to provide a dual protection device for a circuit to overcome disadvantages of a conventional protection device that has only one bi-metallic strip to cut off a circuit when overload, overheat and short. The disadvantages include that the conventional protection device can not cut off the circuit as expected, can not cut off the circuit completely and repeatedly disconnect and connect the circuit.

Another objective of the present invention is to provide a dual protection device for a circuit that includes a reusable first protection unit. A bi-metallic strip of the first protection unit bends to cut off the circuit when the circuit is overloaded. When the circuit is cooled down, the bi-metallic strip bends toward the opposite direction. Thus, the circuit becomes a closed circuit again. Because the bi-metallic strip can disconnect and reconnect the circuit, it does not need to replace the first protection unit. It is cost saving.

Still another objective of the present invention is to provide a dual protection device for a circuit that has a second protection unit. The second protection unit is activated, if the first protection unit does not work as expected and temperature of the circuit is raised to a critical value. Two fuse members of the second protection unit melt due to high temperature caused by being overloaded, thereby cutting off the circuit.

In order to achieve the objectives, a dual protection device for a circuit according to the present invention includes a conductive cover, a first protection unit, a second protection unit and a base. The cover has a first terminal connected thereto. The first protection unit includes an elastic contact piece and a first conductive member. The elastic contact piece has a first end fixed to the cover and a second end having a first contact point. A second contact point is located on the first conductive member. The first contact point is located corresponding to the second contact point. The elastic contact piece is deformed and bent to separate the first contact point from the second contact point when a temperature of the elastic contact piece reaches a first pre-set value. The second protection unit has a second conductive member, a first fuse member connecting the first conductive member with the second conductive member, a second fuse member connecting the second conductive member with a second terminal, and a biasing member. The biasing member is compressed between the second conductive member and the base. The first fuse member and the second fuse member melt when a second pre-set temperature is reached and the biasing member pushes the second conductive member to separate from the second terminal The base has a recess defined therein so as to receive the first conductive member, the second conductive member and the biasing member.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
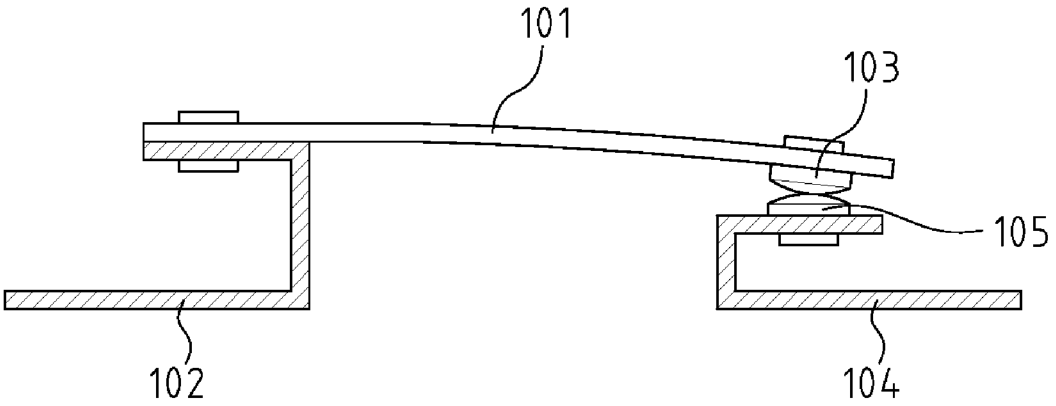
FIG. 1 ( Prior Art )
FIG. 1 is a schematic view showing a conventional protection device for a circuit in a closed circuit.
Figure 2:
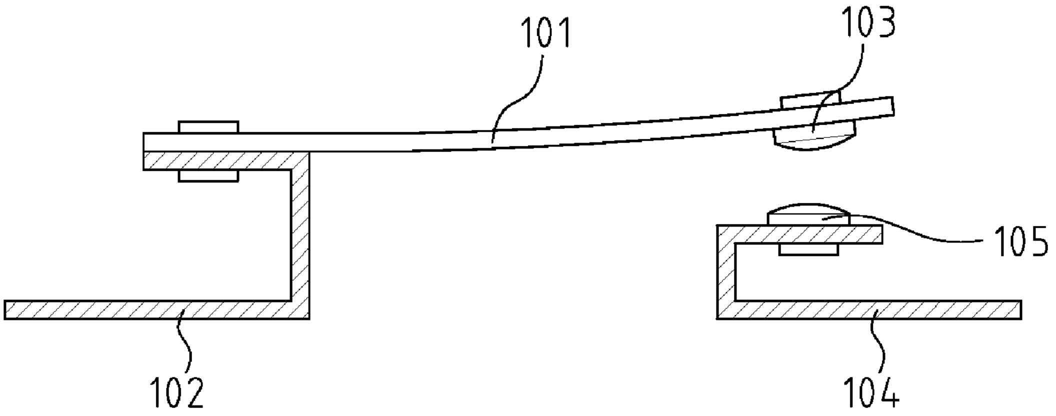
FIG. 2 ( Prior Art )
FIG. 2 is a schematic view showing the conventional protection device for a circuit cutting off the circuit.
Figure 3:
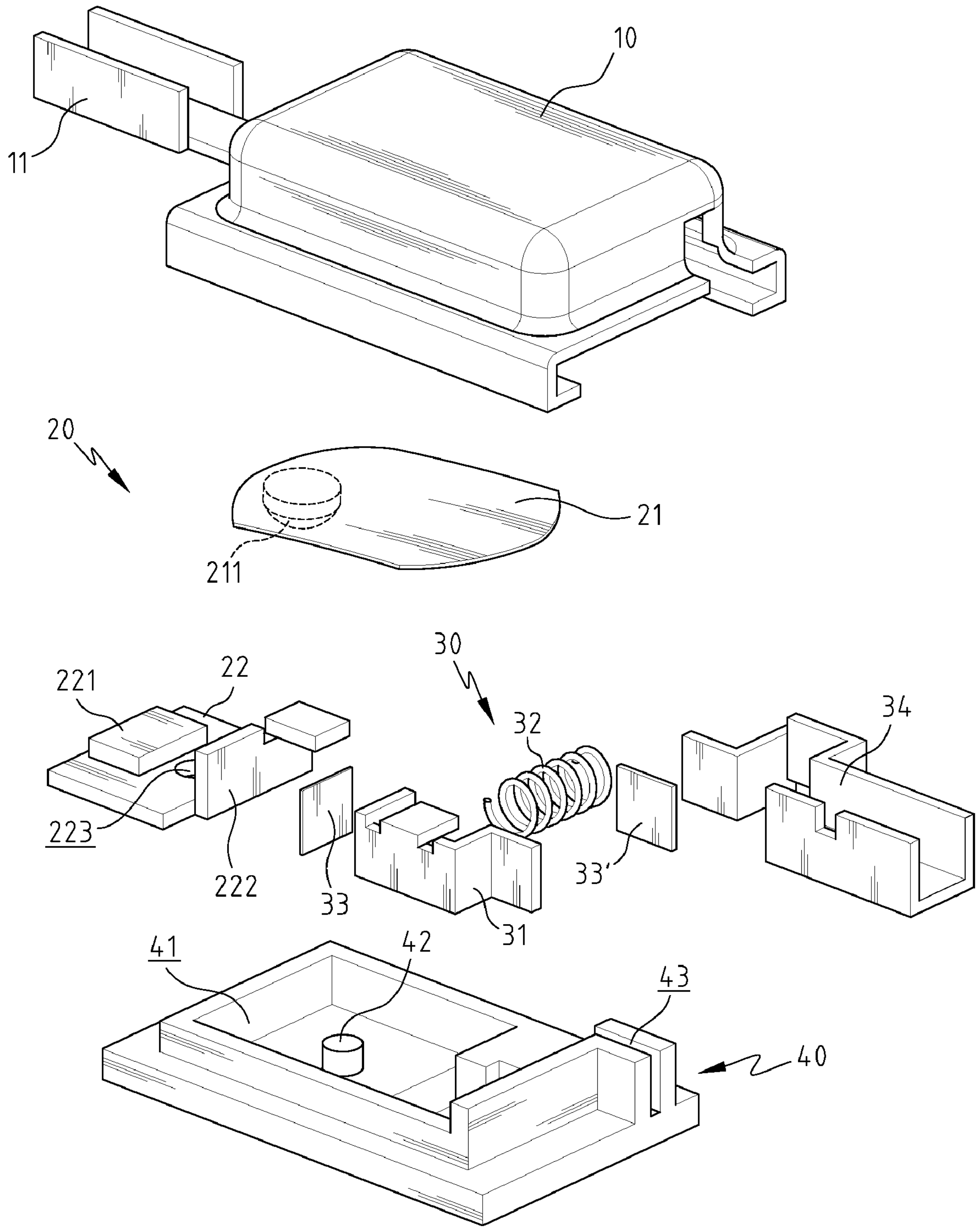
FIG. 3 is an exploded view showing a dual protection device for a circuit according to an embodiment of the present invention.
Figure 4:
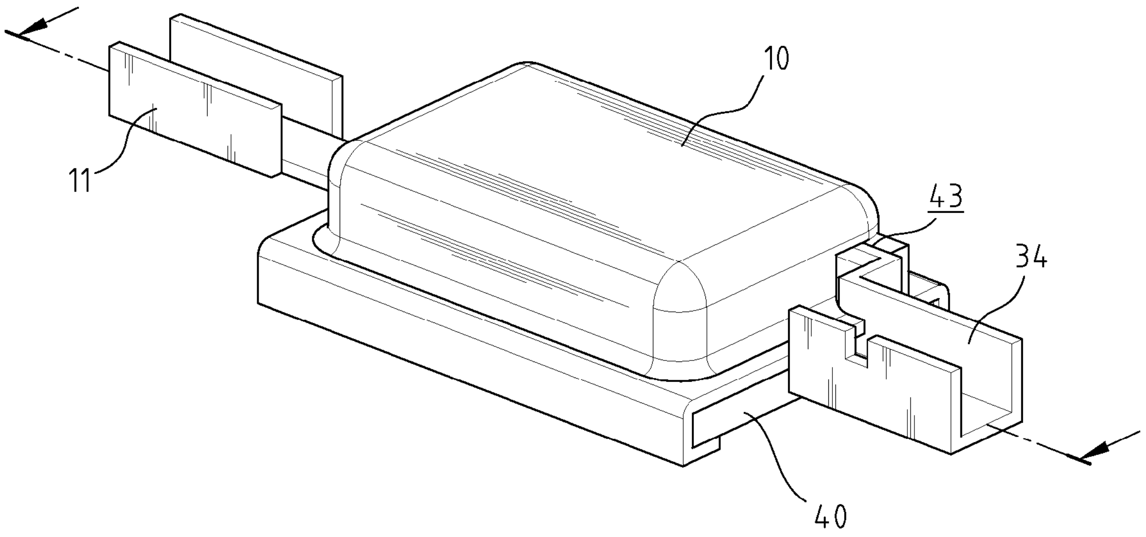
FIG. 4 is a perspective view showing the dual protection device of FIG. 3.

With reference to FIGS. 3 to 6, a dual protection device for a circuit according to the present invention includes a cover 10, a first protection unit 20, a second protection unit 30 and a base 40.

The cover 10 is made of a conductive material and has a first terminal 11 connected thereto.

The first protection unit 20 includes an elastic contact piece 21 and a first conductive member 22. The elastic contact piece 21 is a flexible metal strip. The elastic contact piece 21 is slightly curved in shape and can be bent toward two opposite directions due to temperature change. The elastic contact piece 21 may be made of a bi-metallic material. A first end of the elastic contact piece 21 is fixed to an inner side of the cover 10 and a second end of the elastic contact piece 21 is a free end to bend. The second end of the elastic contact piece 21 is provided with a first contact point 211. The first conductive member 22 is a thin board and a second contact point 221 is disposed on a top of the first conductive member 22. The first contact point 211 is located corresponding to the second contact point 221. The first conductive member 22 includes an assembly hole 223 and a side wall 222.

The second protection unit 30 includes a second conductive member 31, a biasing member 32, a first fuse member 33 and a second fuse member 33'. One side of the second conductive member 31 is fixed with the side wall 222 of the first conductive member 22 by the first fuse member 33, and the other side of the second conductive member 31 is fixed with a second terminal 34 by the second fuse member 33'. The biasing member 32, such as a spring, has a first end pressed against the second conductive member 31.

The base 40 includes a recess 41 defined therein so as to receive the first conductive member 22, the second conductive member 31 and the biasing member 32. The biasing member 32 has a second end pressed against an inside of the recess 41 of the base 40.

An assembly post 42 extends from the floor of the recess 41. When the first conductive member 22, the second conductive member 31 and the biasing member 32 are received in the recess 41, the assembly post 42 is fitted into the assembly hole 223 of the first conductive member 22. The base 40 has a slot 43 defined therein and the second terminal 34 is clamped in the slot 43. The biasing member 32 is compressed between the second conductive member 31 and a side wall of the recess 41.

Figure 5:
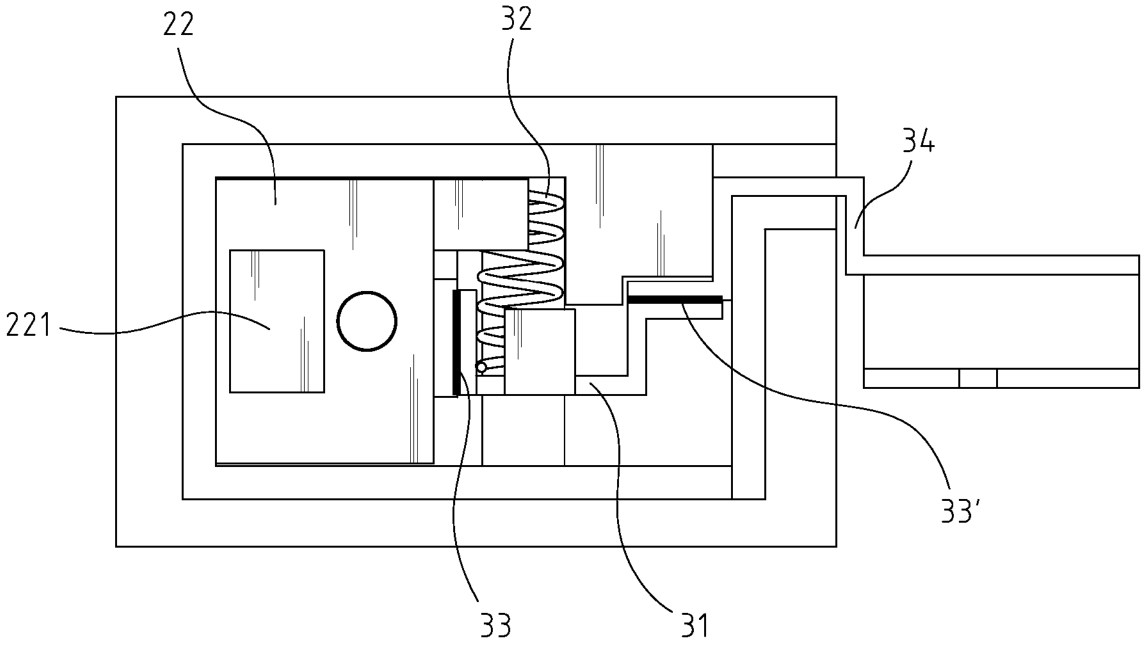
FIG. 5 is a schematic top view showing the dual protection device of FIG. 3, wherein the dual protection device is in a closed circuit state.
Figure 6:
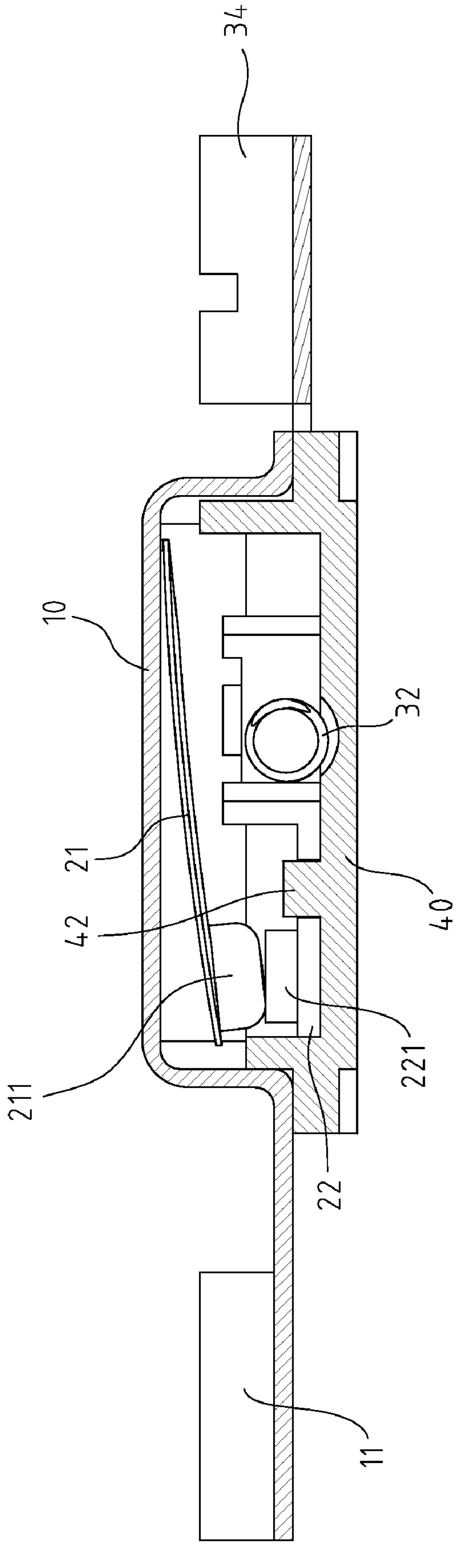
FIG. 6 is a side cross sectional view showing the dual protection device of FIG. 3, wherein the dual protection device is in a closed circuit state.

When the dual protection device is in use, the elastic contact piece 21 bends downward and the first contact point 211 contacts with the second contact points 221. Thus, the electric current passes the first terminal 11, the cover 10, the elastic contact piece 21, the first contact point 211, the second contact point 221, the first conductive member 22, the first fuse member 33, the second conductive member 31, the second fuse member 33' and the second terminal 34 to form a closed circuit as shown in FIGS. 5 and 6.

Figure 7:
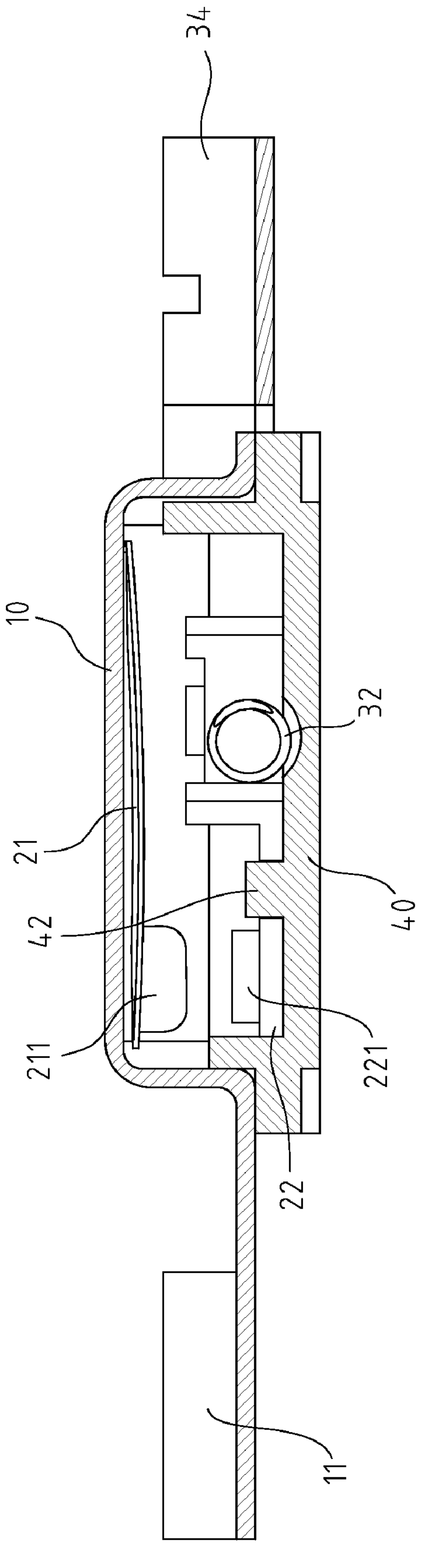
FIG. 7 is a side cross sectional view showing the dual protection device of FIG. 3, wherein a first protection unit cuts off the circuit and the dual protection device is in an open circuit state.

When the circuit is overloaded and reaches a first predetermined temperature, the first protection unit 20 is activated and the elastic contact piece 21 deforms and bends upward to separate the first contact points 211 from the second contact points 221 as shown in FIG. 7, thereby cutting off the circuit. The circuit becomes an open circuit. When the temperature cools down, the elastic contact piece 21 deforms and bends downward. Thus, the first contact point 211 and the second contact point 221 are in contact with each other again as shown in FIG. 6, and the circuit becomes a closed circuit.

Figure 8:
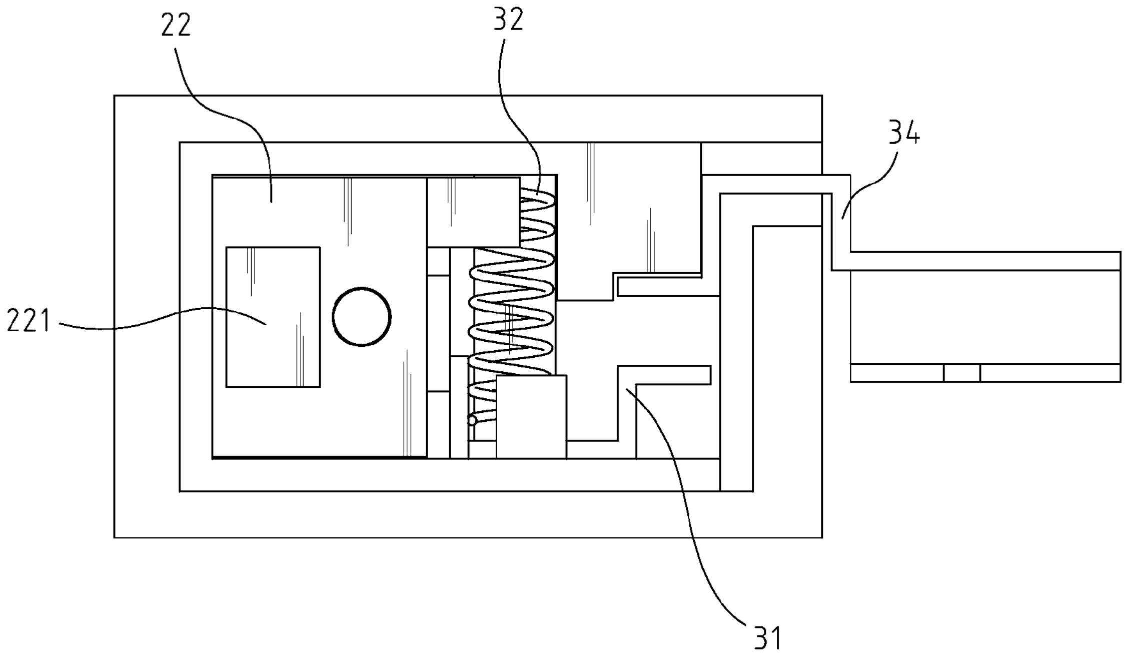
FIG. 8 is a plane view showing the dual protection device of FIG. 3, wherein a second protection unit cuts off the circuit and the dual protection device is in an open circuit state.

If the circuit is overloaded, overheated or shorted, and the elastic contact piece 21 of the first protection unit 20 does not function properly to cut off the circuit, the temperature of the circuit increases continuously. Then, when the circuit reaches a second predetermined temperature, the first and second fuse members 33, 33' melt and bonding between the first conductive member 22, the second conductive member 31 and the second terminal 34 is relieved. The compressed biasing member 32 resumes to its un-compressed state and pushes the second conductive member 31. Therefore, the second conductive member 31 is separated from the second terminal 34, thereby cutting off the circuit as shown in FIG. 8. In this situation, the circuit becomes an open circuit. Because the first and second fuse members 33, 33' melt, the circuit cannot re-connect again by itself after the temperature cools down.

Figure 9:
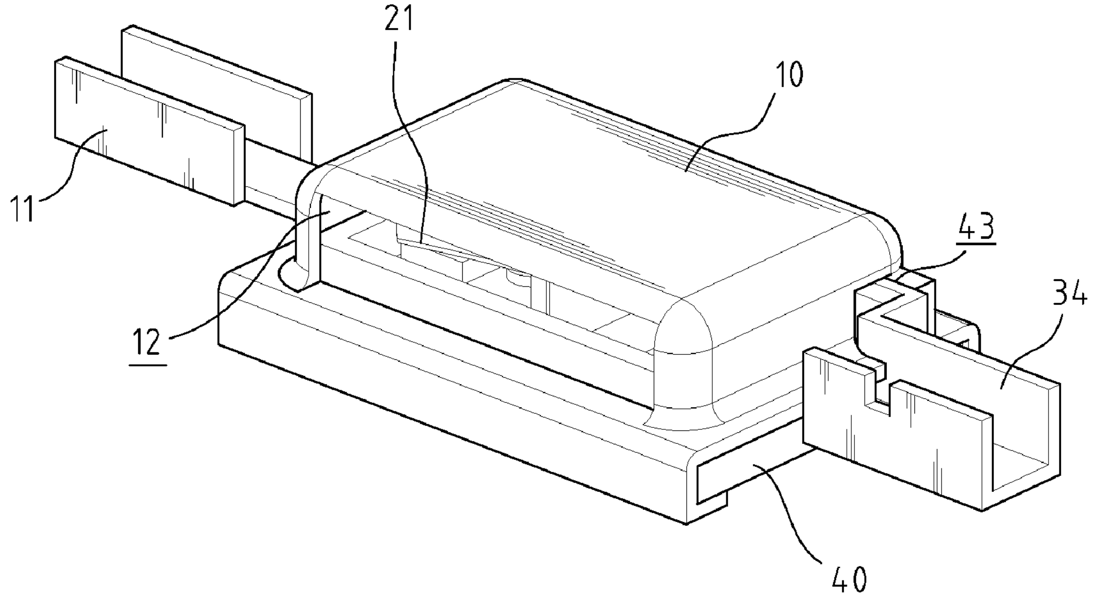
FIG. 9 is a perspective view showing a dual protection device for a circuit according to another embodiment of the present invention, wherein a cover of the dual protection device has an opening at a side thereof.

Referring to FIG. 9, the cover 10 further includes an opening 12 defined at a side thereof for better ventilation. Thus, the first and second protection units 20, 30 can respond to the temperature more correctly and directly.

An activation temperature of the first protection unit 20 is set up lower than that of the second protection unit 30. Thus, the dual protection device in accordance with the present invention uses the first protection unit 20 and the second protection unit 30 to provide first-line and second-line protection, respectively. When the circuit is overloaded, overheated, or shorted, the elastic contact piece 21 of the first protection unit 20 deforms to separate the first contact point 211 from second contact point 221, thereby protecting the circuit. The second protection unit 30 cooperates with two fuse members 33, 33' and the biasing member 32 to cut off the circuit when the first protection unit 20 does not function properly. The first protection unit 20 and the second protection unit 30 function independently, and therefore the dual protection device for a circuit according to the present invention ensures the circuit is protected.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A dual protection device for a circuit, comprising:

a cover made of a conductive material and having a first terminal connected thereto;

a first protection unit comprising an elastic contact piece and a first conductive member, the elastic contact piece including a first end fixed to the cover and a second end having a first contact point disposed thereon, the elastic contact piece being made of metal, slightly curved, and capable of bending toward two opposite directions due to temperature change, the first conductive member having a second contact point disposed on a top thereof, the first contact point located corresponding to the second contact point; wherein the first contact point contacts with the second contact point when the circuit is in a normal state, the elastic contact piece is deformed and bent toward another direction to separate the first contact point from the second contact point when the elastic contact piece reaches a first predetermined temperature;

a second protection unit having a second conductive member, a second terminal, a first fuse member connecting the second conductive member with the first conductive member, a second fuse member connecting the second conductive member with the second terminal and a biasing member having a first end pressing against the second conductive member; when a second predetermined temperature is reached, the first fuse member and the second fuse member melt and the biasing member pushes the second conductive member away from the second terminal; and a base having a recess defined therein so as to receive the first conductive member, the second conductive member and the biasing member in the recess.

2. The dual protection device as claimed in claim 1, wherein the elastic contact piece is a bi-metallic strip.

3. The dual protection device as claimed in claim 1, wherein the first conductive member of the first protection unit includes a side wall and the first fuse member connects the second conductive member with the side wall of the first conductive member.

4. The dual protection device as claimed in claim 1, wherein the biasing member is a helical spring.

5. The dual protection device as claimed in claim 1, wherein the biasing member has a second end pressing against a side wall of the recess of the base.

6. The dual protection device as claimed in claim 1, wherein the base has a slot defined therein and the second terminal is clamped in the slot.

7. The dual protection device as claimed in claim 1, wherein the cover includes an opening defined at a side thereof.

* * * * *